(12) United States Patent
Messmer (10) Patent No.: US 9,969,045 B2
(45) Date of Patent: May 15, 2018

(54) METHOD AND DEVICE FOR DISPENSING SOLID COMPOUND PASTES FOR SURFACE PROCESSING, AND RELATED SURFACE PROCESSING METHOD AND SYSTEM

(71) Applicant: MENZERNA POLISHING COMPOUNDS GMBH & CO. KG, Oetigheim (DE)

(72) Inventor: Rudi Messmer, Loffenau (DE)

(73) Assignee: MENZERNA POLISHING COMPOUNDS GMBH & CO. KG, Ötigheim (DE)

(*) Notice: Subject to any disclaimer, the term of this patent is extended or adjusted under 35 U.S.C. 154(b) by 0 days. days.

(21) Appl. No.: 15/487,806

(22) Filed: Apr. 14, 2017

(65) Prior Publication Data
US 2017/0216990 A1    Aug. 3, 2017

Related U.S. Application Data

(63) Continuation of application No. PCT/EP2015/073850, filed on Oct. 15, 2015.

(30) Foreign Application Priority Data

Oct. 15, 2014  (EP) .................................. 14189020

(51) Int. Cl.
*B24B 57/02* (2006.01)
*B24B 57/00* (2006.01)
(Continued)

(52) U.S. Cl.
CPC .............. *B24B 29/00* (2013.01); *B24B 57/04* (2013.01); *C09G 1/02* (2013.01); *Y02P 70/179* (2015.11)

(58) Field of Classification Search
CPC .......... B24B 1/00; B24B 57/00; B24B 57/02; B24B 57/04
(Continued)

(56) References Cited

U.S. PATENT DOCUMENTS 2,177,992 A * 10/1939 Moon ..................... B24B 57/04
451/19
2,332,992 A * 10/1943 Davis ..................... B24B 57/00
137/857
(Continued)

FOREIGN PATENT DOCUMENTS

DE      4412417 A1    10/1994
DE      19812767 A1    9/1999
(Continued)

OTHER PUBLICATIONS

International Search Report for corresponding International Application No. PCT/EP2015/073850, dated Feb. 22, 2016.
(Continued)

*Primary Examiner* — Robert Rose
(74) *Attorney, Agent, or Firm* — Jason H. Vick; Sheridan Ross PC (57) ABSTRACT

A method for dispensing solid compound pastes for surface treatment to a machining tool comprises the steps of providing a solid compound paste for surface treatment that contains abrasives, softening at least a partial amount of the solid compound paste by supplying thermal energy, feeding the softened solid compound paste to a dosing device by means of a conveyor device that is adapted for abrasive media, and applying the softened solid compound paste to a machining tool by means of the dosing device. A device for dispensing solid compound pastes for surface treatment to a machining tool comprises a heating device that is arranged to heat a solid compound paste for surface treatment that contains abrasives, wherein at least a partial amount of the
(Continued)

solid compound paste is arranged to be softened by supplying thermal energy, a conveyor device having a pump unit comprising at least one pump and at least one conveyor path for the softened solid compound paste, wherein the pump is arranged for conveying abrasive media, and a dosing device arranged for applying the softened solid compound paste to a machining tool.

20 Claims, 5 Drawing Sheets (51) Int. Cl.
B24B 29/00 (2006.01)
B24B 57/04 (2006.01)
C09G 1/02 (2006.01)

(58) Field of Classification Search
USPC .......................................... 451/446, 56, 60
See application file for complete search history.

(56) References Cited

U.S. PATENT DOCUMENTS

| | | | | |
|---|---|---|---|---|
| 2,764,856 A | * | 10/1956 | Steen | B24B 57/00 451/178 |
| 3,044,227 A | * | 7/1962 | Charvat | B24B 57/00 15/21.1 |
| 3,990,192 A | * | 11/1976 | Bonnice | B24B 57/04 125/11.03 |

FOREIGN PATENT DOCUMENTS

| | | |
|---|---|---|
| DE | 29911300 U1 | 9/1999 |
| DE | 29823896 U1 | 3/2000 |
| JP | S55-144963 | 11/1980 |

OTHER PUBLICATIONS

Written Opinion for corresponding International Application No. PCT/EP2015/073850, dated Feb. 22, 2016.

International Preliminary Report on Patentability for corresponding International Application No. PCT/EP2015/073850, dated Apr. 27, 2017.

* cited by examiner

METHOD AND DEVICE FOR DISPENSING SOLID COMPOUND PASTES FOR SURFACE PROCESSING, AND RELATED SURFACE PROCESSING METHOD AND SYSTEM

CROSS-REFERENCES TO RELATED APPLICATIONS

This application is a continuation of International Patent Application PCT/EP2015/073850, filed on Oct. 15, 2015 designating the U.S., which international patent application has been published in German language and claims priority from European patent application 14189020.2, filed on Oct. 15, 2014. The entire content of that priority application is fully incorporated by reference herewith.

BACKGROUND

The present disclosure relates to a method for dispensing solid compound pastes for surface treatment to a machining tool. The disclosure further relates to a device for dispensing solid compound pastes for surface treatment to a machining tool. More generally, the disclosure relates to improvements in methods for machining workpieces with solid compound pastes for surface treatment, and to improvements in automated machining (surface processing) of workpieces. In some exemplary embodiments, the disclosure further relates to a use of a solid compound paste for surface treatment.

German utility model DE 298 23 896 U1 discloses a paste dispenser, particularly for melting and applying a free-flowing, meltable medium that is composed of a storage funnel, a pressure cylinder, a conveyor cylinder, a heatable pressing-out chamber and a pressing-out nozzle.

The present disclosure generally relates to the field of surface treatment, particularly to the field of mechanical surface treatment. The term surface treatment may particularly be understood as involving polishing processes, brushing processes, grinding processes and similar material removing and/or surface-flattening processes. Whenever in the context of the following observations polishing machines, polishing disks, polishing pastes and similar terms are used, this shall generally also involve the corresponding equivalent from grinding machining, shipping machining and/or brushing machining. There is often a floating transition from polishing machining to grinding machining. Polishing applications are frequently assigned to the field of mechanical fine machining, particularly to the field of mechanical ultra-fine machining of surfaces.

Polishing, brushing and grinding may generally be referred to as subgroups of smoothening machining processes. Brushing applications, polishing applications and grinding applications may partially overlap one another. Polishing is generally based on different operating principles. On the one hand, a certain removal of material is present in polishing. Further, polishing regularly results in a deformation and particularly a levelling of roughness peaks of a surface structure of the workpiece. Polishing may further involve at least partially filling up cavities and/or irregularities. Generally, polishing methods, brushing methods and grinding methods are used to reduce the surface roughness of parts and, in some applications, to generate a shine on the surface of the part. Further applications are conceivable wherein the main focus is on burr removal and such like.

Common devices for polishing generally involve at least one polishing disk and/or a polishing belt. The polishing disk may provide a carrier material that is manufactured from natural material (natural fibers, cotton, sisal, paper, etc.) or from artificial material (artificial fibers). Also sponge-like materials may be used for polishing disks. Generally, polishing machining is performed by applying an appropriate polishing agent to the polishing disk. Due to a relative movement between the polishing disk and the workpiece to be machined, the respective polishing agent may contact the workpiece to act thereon in a processing, particularly smoothening manner.

Polishing disks, brushes or grinding discs may comprise operating regions that involve fabrics in general, cotton, sisal, polymers, paper, felt, leather and similar components. The disks may generally be referred to as polishing agent carrier. The abrasive grain may be formed, for example, on the basis of alumina, aluminum oxide, chromium trioxide or similar hard materials.

The present disclosure further relates particularly to the field of industrial grinding and/or polishing, and in some respect to highly automated grinding and/or polishing. Grinding devices or polishing devices are known that involve machining cells, for instance, wherein, on the one hand, the polishing device as such and, on the other hand, also elements for automated feeding of workpieces to be machined are present. By way of example, handling devices such as robots, rotary transfer machines or flatbed polishing machines may be provided are arranged to grip workpieces to be machined and to bring the same into contact with the polishing disk. Further, the handling devices may be arranged to effect a relative movement between the workpiece and the polishing disk to machine the desired regions of the workpiece. In other words, and handling robot may be provided, for instance, that imitates a "manual" swiveling and/or displacing of the workpiece relative to the (rotating) polishing disk.

It is generally necessary to replace the dissipating polishing agent at the polishing disk. This is often performed at intervals and/or quasi-continuously. By way of example, the polishing agent may be "massaged" in the polishing disk. The application of massaging in may be performed intermittently and/or periodically. Commonly, agents that are at least partially effective for abrasive purposes, more generally, agents for surface treatment, i.e. for instance polishing agents, brushing agents or grinding agents, are offered in defined dosage forms and/or states. This may involve, for instance, solid compound pastes or emulsions. Further, polishing agents and such like may be present in a form of ointments, creams and/or polishes.

Emulsions for surface treatment are commonly composed of a mixture of water, fats, oils and abrasive grain (commonly based on ceramics) that is ideally uniformly distributed in the emulsion. Emulsions for surface treatment are commonly liquid and pourable at room temperature (25° C.). A consistency is comparable, for instance, with a consistency of drinkable yoghurt. As the respective emulsions are pourable already at room temperature, the emulsions may be simply conveyed via piping systems, tubes and such like. The emulsions may be applied through spraying nozzles and sprayed on the polishing tool.

Solid compound pastes for surface machining form a second substantial group of grinding agents or polishing agents. Solid compound pastes generally involve mixtures of lipids (comprising for instance fats, oils and waxes), additives admixed thereto, and a respective share of abrasive grain that is admixed to the carrier material, ideally uniformly dispensed. Depending on the intended application, the abrasive grains may involve a size of 0.1 µm (micrometer) to about 200 µm. The abrasive grains may form a mass fraction of 50% to 80% of the paste. Generally, solid compound pastes are mixed and/or formulated at a slightly increased temperature. A mixture that is formed in this way is generally poured in molds to be present, after solidifying, as bar-shaped or rod-shaped solid compound pastes. Rods of solid compound pastes that are suitable for industrial machining may have a length of about 300 mm to 500 mm. In particular, solid compound pastes of this kind may be referred to as so-called automat bars. Solid compound pastes may involve polishing pastes, brushing pastes, grinding pastes and appropriate mixtures thereof.

Solid compound pastes feeding apparatuses are known into which rods of this kind may be clamped. Feeding apparatuses of this kind may involve drives that enable a feeding movement having a pilger process character. By way of example, the rod may be pushed against the rotating grinding or polishing disk at regular (temporal) intervals. Due to the relative movement between the disc and the solid compound paste, significant friction heat is generated by means of which the solid compound paste is softened and/or melted at its contact surface with the disc. Accordingly a certain part of the softened material is transferred to the polishing tool. Due to the huge circumferential velocity of the discs, this kind of transfer often involves losses. Parts of the melted and/or softened solid compound paste are simply thrown away from the disc. It may be commonly expected that 50% to 80% of the solid compound paste are received by the disc and usable for machining purposes. The remaining fraction (20% to 50%) may not be used for the machining process and have to be accepted as losses.

Both the machining with solid compound paste bars and the machining with emulsions involve several drawbacks. Polishing with solid compound pastes and particularly solid compound paste feeding apparatuses for the automated machining are essentially based on traditional and tried and tested technologies. Solid compound paste feeding apparatuses "imitate" a manual application of the polishing agent to the polishing disc. The maximum length of the rods, however, limits the possible operating time of such a polishing device as accordingly new rods have to be reloaded when an older rod is consumed. This stands in contrast to the concept of automated machining.

Further, a solid compound paste rod often may not be entirely processed as a minimum length may not be undercut. This may be required, on the one hand, due to safety aspects (refer for instance to a minimum pad thickness of a brake pad). Further, this may be simply caused by the fact that the rod has to be guided and gripped in the solid compound paste feeding apparatus to provide a feed that is for instance pilger process like. The mentioned residual amount therefore even further increases the losses. It is also adverse from an environmental perspective and from a disposal perspective that—depending on the actual application conditions—no more than half of the basically provided paste amount is actually usable for machining. When transferring the paste to the polishing disc partial amounts of the paste are regularly thrown away. Accordingly, a great mess may be present. Solid compound paste feeding apparatuses always have to be placed in close proximity of the polishing disc and/or the polishing wheel to be able to bring the rod into engagement with the wheel, respectively. Hence, solid compound paste feeding apparatuses are strongly exposed to the contamination.

A further drawback of established methods for machining with solid compound paste bars can be seen in the requirement that the solid compound paste bar and/or the solid compound paste rod ideally comprises a width that is adapted to the width of the polishing disc. This results in a huge variety of variance and increases the unit costs.

The emulsions for surface treatment described further above, however, may basically be processed in an automated fashion as they are flowable (fluid) already at room temperature. However, it has been observed that the grinding result and/or polishing result when using solid compound pastes is often superior to the result when emulsions are used. Further, with solid compound pastes, often shorter cycle times are possible. Emulsions are always formulated under the condition of the required ability to flow and/or to be pumped at room temperature. Accordingly, the composition of an emulsion may be varied only in relatively narrow borders. In contrast thereto, solid compound pastes enable significantly further reaching variations and modifications in terms of their composition.

Also with polishing methods that involve polishing agents in the form of emulsions, a considerable amount of the emulsion may get lost without being usable for the machining. This is explainable with the slinging way of partial amounts of the emulsions due to the polishing discs rotating at huge circumferential velocity.

Further, it could be observed in some cases that grinding and polishing waste based on polishing agents or grinding agents sometimes have a tendency to self-heating and/or self-ignition. This may involve, as the case may be, even the initiation of fires and, accordingly, involve a huge risk for the manufacturing facilities and also for operating staff.

Further, polishing agents on the basis of solid compound pastes are superior over emulsions as considerably fewer conditions have to be complied with for storing the same. In particular, it could be observed that emulsions (dispersions) may undergo self-demixing at low temperature (for instance under 0° C.) and at temperatures higher than about 40° C. This may involve that the emulsions become unusable and simply have to be disposed, at worst case as special waste. Also in terms of time, relatively in narrow limits must be observed with when storing emulsions. Solid compound pastes are significantly less sensible in terms of temperature variations and extreme temperature. Commonly, polishing agents on the basis of solid compound pastes may be moved and/or stored at between about −60° C. to +80° C. Increased temperature may in fact involve deformations when fractions of the solid compound paste are melted. However, this is generally a reversible process and does not have an adverse effect on the suitability for use of the solid compound pastes.

The afore-mentioned DE 298 23 896 U1 generally proposes, in fact, to use a free-flowing and meltable polishing agent to combine based thereon the advantages of solid compound pastes and emulsions (referred to as liquid pastes in DE 298 23 896 U1). It is generally stated to this end to implement a pressure cylinder, a conveyor cylinder, a heatable press-out chamber and a press-out nozzle. However, in no way details of such an arrangement are mentioned in DE 298 23 896 U1. If at all, it may be concluded from this document that apparently free-flowing pastes are conveyed by means of a conveyor system towards the heatable press-out chamber and the press-out nozzle. Apart from that, no hints or suggestions of how to arrange such an apparatus and of how to render it operative are present in this document. Further, no further reference to the polishing agents used can be found in the document.

In view of this, it is an object of the present disclosure to present a method for dispensing solid compound pastes for surface processing that may be used with automated machining facilities for grinding machining and/or polishing machining and that may further increase the degree of automation thereof, at least in some embodiments.

It is a further object of the present disclosure to present a corresponding device for dispensing solid compound pastes for surface processing.

It is a further object of the present disclosure to present improvements in surface processing methods and devices that facilitate the use of polishing agents on the basis of solid compound pastes in manufacturing facilities for surface processing, involving polishing and grinding processing.

It is a further object of the present disclosure to present improvements in surface processing methods and devices that enable a continuous or quasi-continuous supply with the solid compound paste, preferably without the need of replacing polishing bars, polishing rods and similar partial amounts of the solid compound paste at a high replacement frequency.

It is a further object of the present disclosure to present improvements in surface processing methods and devices that enable a minimization of losses when applying or transferring the solid compound paste to the polishing disc or the polishing belt.

It is a further object of the present disclosure to present improvements in surface processing methods and devices that enable cost savings preferably by increasing the operating time available for processing and by reducing idle times and polishing paste losses.

It is a further object of the present disclosure to present a method for surface treatment of workpieces and a corresponding system that is suitable for performing the method, wherein both the method and the system may profit from the supplying/dispensing method and device described herein.

It is a further object of the present disclosure to present potential uses of a polishing agent in the form of solid compound pastes in a method for dispensing solid compound pastes and/or for surface treatment using solid compound pastes.

SUMMARY

In regard of the dispensing method, these and other objects of the are achieved by a method for dispensing solid compound pastes for surface treatment to a machining tool that comprises the following steps:

providing a solid compound paste for surface treatment that comprises abrasives, for instance a solid compound paste having a lipid based carrier material to which abrasives are admixed, softening at least a partial amount of the solid compound paste by supplying thermal energy, wherein a mixing level of the softened paste with the abrasives is substantially maintained, feeding the softened paste by means of a conveyor device that is arranged for abrasively effective media to a dosing device, and applying the softened paste to a machining tool by means of a dosing device, for instance applying to a tool for surface treatment.

In accordance with the above aspect it is proposed to soften a solid compound paste (for instance polishing paste, brushing paste or grinding paste) until the paste at least to some extend behaves like a fluid so that a transport through a piping system or tube system is possible. It is, however, substantial that the solid compound paste is not melted until substantial fractions of the previously fixedly embedded abrasive grain may sediment. If one would entirely melt the solid compound paste, the abrasive grain that basically remains in the solidified state and that has greater specific weight than the carrier materials of the solid compound paste could deposit downwards. This is, however, prevented as much as possible, when the solid compound paste is softened only until a sufficiently fluidic behavior is present but, however, the internal bonding of the carrier substances is still sufficiently strong so that the abrasives not deposit or do only deposit in negligible amounts.

Whenever the term solid compound paste is used within the context of this disclosure, this shall be referred to as a paste that essentially solid at room temperature. The solid compound paste may have a consistency at room temperature that is comparable to the consistency of frozen butter. Hence, solid compound pastes significantly differ from emulsions that are at room temperature regularly emulsified and/or liquid. It is not intended within the context of the present disclosure to convert the solid compound paste to the liquid aggregate state. The solid compound paste may be converted by heating into the softened phase. Due to its composition, the solid compound paste commonly comprises a broad melting range, i.e. in a standard case there is no fixed temperature where an abrupt change of the aggregate state from solid to liquid takes place.

In a chemical respect, the solid compound paste may be a formulation on the basis of lipids. Lipids may involve fats, oils and waxes and respective mixtures. The lipids in the solid compound paste may also be referred to as carrier material. In the carrier material, additives may be embedded. Further, the carrier material may be admixed with abrasives, i.e. with polish materials or polishing agents for mechanical surface treatment. Generally, the abrasives are admixed to the carrier material in a finely distributed fashion, for instance uniformly distributed as much as possible. Generally, abrasives may also be referred to as abrasive grain and/or abrasive agent.

The mixing level may characterized the homogeneity of the mixture. The term "homogeneity", however, shall not be interpreted in the chemical/physical sense. Rather, the homogeneity of the mixture shall designate the uniform distribution of the (solid) particles of the abrasive material in the carrier material. In this sense, a great homogeneity may result when the particles are anyway, statistically, evenly distributed and have substantially constant distances to their neighbor particles, for instance. It goes without saying that in terms of the mixture, already due to the applied process, certain inhomogeneities may be caused when manufacturing the solid compound paste, for instance due to (partial) sedimentations when formulating the solid compound paste. Also such a mixing level is substantially maintained when the paste that is obtained from heating the solid compound paste is merely softened or slightly melted. This involves in some embodiments that the carrier material is not entirely melted.

According to a further embodiment of the method, the solid compound paste has, at room temperature, a substantially stiff to elastic consistency, wherein the solid compound paste may be brought, by heating, to a softened state in which the softened paste comprises a substantially plastic to soft consistency, for instance a pasty consistency. For illustrative purposes, reference in this context is made to the German standard DIN 1045 (German Institute for Standardization, DIN 1045: Concrete, reinforced and prestressed concrete structures) and/or the European standard EN 206 (European Committee for Standardization, European Norm, EN 206: Concrete—Specification, performance, production and conformity) that relate to the consistency of fresh concrete, for instance. According to DIN 1045, as an example, for fresh concrete the following consistency classes are present: stiff-plastic-soft-very soft-flowable (fluid)-very flowable (fluid).

It is to be noted that the mentioned ranges (stiff to plastic and plastic to soft) anyway do not have overlaps for one and the same type of the solid compound paste, for instance when two different states are observed, wherein one state corresponds to the room temperature and another state corresponds to an increased temperature of 50° C., 70° C., or even 100° C. The solid compound paste may be brought to a temperature in a range between 28° C. and 150° C. for softening, depending on its composition. The temperature is to a great extent dependent on the melting point of the used lipids.

The consistency of the solid compound paste at room temperature may accordingly be in a range that is referred to in accordance with DIN 1045 as stiff to plastic. A huge viscosity is present at room temperature. By heating and/or by supplying thermal energy, the viscosity of the solid compound paste may be reduced. The resulting consistency is ranged in DIN 1045 in a range "plastic-soft". The heated paste is, within borders, flowable (fluid), while a significant viscosity is present. The state of the softened paste may also be referred to as pasty.

For elucidating the consistency of the solid compound paste and/or the softened paste, the following comparison is referred to: As already indicated above, the solid compound paste generally comprises, at room temperature, a consistency that is comparable to the consistency of deep-frozen butter. The consistency of the softened paste may, for instance correspond to the consistency of butter at room temperature (for instance 20° C. or 25° C.). Also with butter there is no fix defined discrete melting point. Similar to butter, the solid compound paste may, depending on the composition, have a more or less wide melting range, wherein the change of the aggregate state of the single fractions or portions respectively takes place. The consistency of the softened paste may also be referred to the consistency of mustard that is stored in a refrigerator (at about 8° C.).

When the paste has the desired softened consistency, it is on the one hand sufficiently fluidic, to be conveyed by pumping, for instance. However, the paste is still sufficiently stiff and/or viscous to prevent sedimentation of the abrasive grain and/or the grinding particles as much as possible.

According to a further embodiment, the softening of the solid compound paste is, for the admixed abrasives, substantially sedimentation-free, wherein the paste in the softened state, in some exemplary embodiments, comprises a substantially homogeneous distribution of the admixed abrasives. It is to be noted that, in a chemical/physical sense, the softened paste is a heterogeneous mixture. It is however desired that the abrasives and/or the abrasively effective particles are distributed in the softened paste in a homogeneous or at least substantially homogeneous fashion. In some exemplary embodiments, the abrasives are substantially uniformly colloidally mixed in the softened paste.

According to a further embodiment, the step of feeding comprises a feeding by means of a fluid energy machine, for instance pumping by means of a pump unit that is configured for abrasively effective media. Pumps and/or pump units that are suitable for abrasively effective media may be for instance based on operating principles and design principles that are known with concrete pumps. By way of example, the pump unit may involve an eccentric screw pump. Also plunger pumps are conceivable. A possible design principle for wear-resistant pumps that are configured for abrasively effective media may involve providing respective surface coatings that are sufficiently hard to resist the abrasively effective media long enough. A further operating principle may involve forming a separation between the abrasively effective media and operative cavities of the pump. This may be for instance achieved by having a pump that mediately acts on the medium to be conveyed via a tube or a similar intermediate element. A further approach to pumps that are suitable for abrasive media may involve to deliberately provide a huge play between the involved operating surfaces. This may involve, for instance, at plunger pumps a remarkable play between a plunger and a cylinder track surrounding the plunger.

In recent years, some progress with the design of pumps that are suitable for abrasive media has been achieved. Accordingly, economically reasonable service life-times have been achieved so that the pumps are economically usable. This was not at all the case in the past. According to one embodiment, the pump unit is at least sectionally heatable. In this way, it may be ensured that the softened paste maintains its desired consistency at least to the extent that feeding is possible.

According to at least some alternative embodiments, it is conceivable to provide a pump-like pressing-out unit, for instance similar to a syringe, instead of a pump. The pressing-out unit may be for instance arranged as a plunger that cooperates with a vessel in which the solid compound paste is received, wherein the vessel may then act as a cylinder for the plunger. Such a unit may be basically arranged in a fashion at least similar to a pastry press and/or fat-press, or a dispensing unit of a glue gun. A further embodiment may be for instance arranged in accordance with a cartridge press.

According to a further embodiment of the method, the step of feeding comprises feeding the softened paste along at least one at least sectionally heatable conveyor path of the conveyor device. This may be for instance be performed via an at least sectionally tempered line. It is ensured also in this way that the softened paste has the desired consistency when the processing and/or the transport take(s) place.

In accordance with a further embodiment of the method, the step of providing involves providing a container that comprises a vessel that is filled with a solidified amount of the solid compound paste, wherein the vessel is, in some exemplary embodiments, filled with a compact amount of the solid compound paste. In other words, the vessel may be filled with a single compact amount. Whenever in the context of this disclosure reference is made to a "compact amount", this shall be understood as a densified amount that, in some exemplary embodiments, does not comprise huge intermediate spaces or cavities. Nevertheless, it is conceivable that shrinking cracks may be formed when the vessel is filled with a sufficiently softened amount and thereafter the amount is solidified. This is not in contrast to the term "compact amount".

Accordingly, in some exemplary embodiments, the container may already be formed at the manufacturer or supplier of the solid compound paste by filling the vessel with the solid compound paste. This may involve, in the context of the manufacture, for instance a filling with a solid compound paste that is, at the part of the manufacturer, entirely or nearly entirely melted. This may directly follow the formulation of the solid compound paste that generally takes place at temperatures, wherein substantial components of the carrier material that is generally formed on the basis of lipids, is liquid. It is basically also conceivable to soften or even melt a solid compound paste that is initially after the original formulation solidified once again to fill the vessel. Generally, a mixing, for instance a mechanical mixing of the slightly melted or melted solid compound paste may be provided to ensure the desired homogeneity of the mixture with the abrasives.

In contrast to known rod-like or bar-like shapes of solid compound pastes for surface treatment, several potential benefits may be provided, depending on the respective embodiment. On the one hand, the container may be directly used at the customer without the need of transferring or moving the solid compound paste. For instance, the container may be coupled to the pump unit.

In the container, a greater amount of the solid compound paste may be provided. Hence, the container may for instance involve barrels or barrel-like vessels that have a weight of several 100 kg (kilogram) up to 800 kg or even 1,000 kg. Accordingly, a replacement of the container in the machining facility is required less frequently than for instance a replacement of a solid compound paste bar. As the solid compound pastes are commonly storable for long periods of time, no drawback results therefrom. In some exemplary embodiments, a single container may be used to supply a plurality of manufacturing facilities, i.e. a plurality of polishing discs in accordance with the above-described aspects of the method with the softened paste. Hence, a central paste supply for a plurality of manufacturing devices may be present.

In accordance with a further refinement of this embodiment, the solid compound paste is processed directly in the vessel, for instance softened in the vessel and conveyed by the pump unit out of the vessel. To this end, the vessel may be coupled with a heating device that at least sectionally heats the amount of the solid compound paste that is present in the vessel. In some exemplary embodiments, the suction side of the pump unit is directly coupled to the container and/or to the softened solid compound paste in the vessel. By way of example, it is conceivable to form the pump unit as so-called barrel follower plate having a pump. The barrel follower plate may be arranged to be lowered deeper in the container as the filling volume is reduced, for instance to follow a surface of the remaining solid compound paste. Accordingly, the desired contact of the pump with the (partially softened) solid compound paste is ensured. By means of such a pump unit that is specifically adapted to the type of the vessel, the paste may be directly conveyed from the vessel and further transferred in a pressurized state.

Generally, a barrel follower plate pump may be coupled to a respective access opening of the vessel, for instance with an opening of a barrel, to convey and/or discharge goods contained therein "from above". The barrel follower plate pump may further involve a handling system that ensures that the pump is lowered down to an actual height level of the remaining goods in the vessel. It goes without saying that the above-used terms "from above" and/or "height level" may be transferred to other orientations accordingly when the container assumes another position and/or when the pump unit is not to be coupled to the vessel "from above".

According to a further embodiment of the method, the step of applying involves dispensing the paste through a nozzle that is adapted to the machining tool. The dispensing of the paste may be performed, for instance, in a continuous or quasi continuous manner. Also a dispensing at intervals is conceivable. For instance, the nozzle and/or a nozzle opening may be adapted to a tool width. In some exemplary embodiments, the nozzle involves a so-called wide slot nozzle. The nozzle may provide an appropriate transition between an inlet line that is substantially round shaped and a flat outlet opening.

Other types of nozzles are conceivable. According to a further embodiment of the method, the step of applying involves applying the paste through a high pressure nozzle that is spaced away from the machining tool. The nozzle may be a high pressure nozzle through which the softened paste is dispensed (sprayed) at high pressure. This may take place at a high pressure nozzle at a pressure of about 12 bar, 16 bar, 20 bar, 36 bar or even higher pressure and/or overpressure. Even when the paste in the softened state comprises a pasty consistency, due to the great pressure, a safe transfer to the machining tool can be ensured.

According to a further embodiment of the method, the step of applying involves dispensing the paste to a guide element, for instance to a pressure guide plate that is arranged in a peripheral region of the machining tool, wherein paste that is present at the guide plate is entrained by the machining tool. In some exemplary embodiments, the guide plate is adapted to the peripheral region of the machining tool. In some exemplary embodiments, the guide plate with a nozzle, for instance a wide slot nozzle. In other words, the nozzle may end in the guide plate. The guide plate may be at least sectionally contacted by the machining tool, at least temporarily, when the machining tool receives partial amounts of the paste from the guide plate. The guide plate may be brought into contact with the machining tool, at intervals or periodically. The guide element may be brought into an abutment with the machining tool at a slide pressure. The act of transferring the paste to the machining tool may generally be referred to as "massaging in". By way of example, the application may take place at intervals that may for instance involve a contact having a duration of 1 to 3 seconds every 60 seconds. It is to be noted that this is only an exemplary mode. A huge number of different modes for the application is conceivable.

By way of example, the guide plate and the peripheral region of the machining tool may form a tapered slot at the end of which a constricted place or contact spot between the guide plate and the machining tool is provided. The constricted space and/or contact space may be formed at the end of the slot that is, in the direction of rotation of the machining tool, offset from the other end.

The paste may be applied through the nozzle and at least partially deposited at the guide plate without the need of dispensing with great overpressure or even high pressure. Rather, a pasty amount may be deposited at the guide plate in such a way that the application to the machining tool is basically performed by an entrainment and/or a picking off from the guide plate. In other words, it is not necessarily required with this embodiment that the paste is applied at such a great pressure that a defined gap between the nozzle and the circumference of the machining tool has to be bridged over for instance by spraying the paste.

In some exemplary embodiments, the guide plate is arranged as a wearing part. This may involve that the guide plate is easy to replace. Accordingly, there is no substantial drawback when also the guide plate itself is subject to an abrasive wear, when the machining tool entrains the paste from the guide plate.

In accordance with the proposed preferred embodiments of the nozzle and the guide plate, there may be the effect that considerably fewer losses are occur when applying the paste. For instance, a smaller amount of the paste is thrown away from the machining tool. Hence, also the inclination to soiling may be significantly reduced.

Both the nozzle and the guide plate may be at some kind provided with a feed drive and/or follower drive to compensate, for instance, a wear at the machining tool that may be reflected in a continuous reduction of the perimeter of the machining tool.

According to a further embodiment of the method, the step of applying involves dispensing the paste through an opening having a defined cross-section that is arranged as a die for the paste to be dispensed, wherein the dosing device is arranged to cooling the softened paste in connection with the dispensing in such a way that the paste is at least partially solidified in the vicinity of the opening and, in some exemplary embodiments, extended as extruded bar. Accordingly, the paste that is again present as solid compound paste may contact the machining tool in a basically known fashion, so that the machining tool may soften the partial amount of the solid compound paste due to friction heat, and remove the same.

According to a further embodiment of the method, the step of providing the solid compound paste comprises providing a modified formulation, for instance a thixotropic formulation. This may for instance involve adding a thixotropic binding agent. In an exemplary refinement, at least some components of the formulation from which the solid compound paste is formed, are modified or thixotropic to prevent or, at least, defer a demixing when at least parts of the solid compound paste are in a softened state.

According to an exemplary arrangement, components of the solid compound paste, for instance those that are slightly melted or melted when the softening takes place, modified, for instance thixotropic, to prevent an excessive separation or demixing of the softened components. Even though it is not desired to entirely melt the solid compound paste, it may at least in some embodiments not always entirely be ruled out that partial amounts are softened for sufficiently long periods and remain in this softened state so that at least parts of the formulation may demix. Single components may settle (and/or may sediment) and impair the function. This adverse demixing may be prevented by a defined modification or thixotropic making of at least some components. This has the advantage that the desired homogeneity may be maintained also when a part of the solid compound paste is softened and, for instance due to long conveyor paths or in the container itself, remains for a longer period in the softened state.

For the purpose of thixotropic rendering, selected additives may be admixed to the formulation. Thixotropic rendering may involve admixing silica or other suitable silicon compounds. Furthermore, the admixture of metal soaps, such as lithium soap or potassium soap, is conceivable. Further, also thixotropic rendering through mechanical impact is conceivable that involves, for instance, a defined shear stress. This may take place in a context of an emulsification. Conventional solid compound pastes that are processed as solid compound paste bars do not require thixotropic properties as the softening and/or melting takes place only in connection with the application to the grinding disc and/or polishing disc.

Hence, this may result in a formulation of the solid compound paste that differs from a conventional formulation of solid compound pastes for processing in bar shape. Known solid compound paste bars are regularly softened only when being applied to a polishing disc or grinding disc. This typically takes place due to friction, when the solid compound paste bar is pressed against the rotating polishing disc or grinding disc at a defined feeding force. This involves no or only a smaller risk of demixing. It goes without saying that solid compound pastes in the context of the present procedure may also be processed in the modified/thixotropic state in rod shape or bar shape.

In regard of the machining method, the above mentioned and other objects are achieved by a method for surface treatment of workpieces that comprises the following steps:
  providing a machining tool, for instance a polishing disc or brush,
  dispensing a solid compound paste for surface treatment to the machining tool in accordance with at least one of the afore-mentioned aspects, and
  machining, for instance grinding or polishing, a workpiece with the machining tool to which the paste is applied.

The machining method may be further developed by at least one of the following steps:
  automated machining of a plurality of workpieces that are brought into contact with the machining tool by a handling device one by one for machining purposes, and
  dispensing the solid compound paste for surface treatment to the machining tool.

The handling device may for instance involve a robot. Also handling devices in the shape of rotary index tables are conceivable. It goes without saying that a plurality of handling devices may be combined with one another.

The handling device may for instance involve a handling device comprising a handling robot. The solid compound paste may basically be applied to the machining tool intermediately (periodically). This may involve fixed or flexible intervals.

Typical polishing machining processes may relate to polishing metal. Metals may, on the one hand, be polished to achieve a desired final shape, for instance a desired gloss degree. Polishing operations may be, however also necessary as an intermediate machining step. For instance, by means of abrasive machining procedures which of course may also relate to grinding procedures or brushing procedures, a preparation of a workpiece for a galvanization, for instance chromium plating or a similar machining and/or coating process may be performed. This may involve removing and/or levelling burrs, for instance stamping burrs or similar machining burrs. It goes without saying that also non-metallic surfaces and coated and/or painted surfaces may be machined with respective machining tools, for instance polished.

A further exemplary aspect of the machining method is that a plurality of machining stations and/or machining facilities may be centrally supplied with the solid compound paste.

In respect of the device, the above mentioned and other objects are achieved by a device for dispensing solid compound pastes for surface treatment to a machining tool, wherein the device comprises:
  a heating device, that is arranged to heat a solid compound paste for surface treatment that comprises abrasives, for instance a grinding paste or polishing paste with a lipid based carrier material to which abrasives are admixed, wherein at least a partial amount of the solid compound paste is arranged to be softened by supplying thermal energy, wherein mixing level of the softened paste with the abrasives is substantially maintained,
  a conveyor device having a pump unit that comprises at least one pump that is arranged for conveying abrasively effective media, and with at least one conveyor path, for instance a conveyor line, for the softened paste, and a dosing device for applying the softened paste to a machining tool.

A further aspect of the present disclosure relates to a system for automated machining of workpieces comprising:
- a dispensing device in accordance with at least some of the afore-mentioned aspects,
- at least one machining tool, for instance a polishing disc or brush, and
- at least one automated handling device, that is arranged to bring workpieces, one by one, into contact with the machining tool for machining purposes.

In accordance with at least some embodiments, it is preferred that a plurality of machining stations or machining cells is present, each comprising a machining tool and an automated handling device, wherein the supply of the solid compound paste is provided by only one dispensing device with respective dosing devices. It goes without saying, accordingly, that the conveyor device comprises a plurality of conveyor paths.

According to an exemplary embodiment of the device, the pump is arranged as barrel follower pump and arranged to be coupled with a container that comprises a vessel that is filled with a solidified amount of the solid compound paste, wherein the heating device comprises a heating unit that is coupled to the pump, wherein the vessel is substantially, or even exclusively, actively heatable by the heating unit that is coupled to the pump. In this way, the solid compound paste may be softened in an energy efficient fashion. In some exemplary embodiments, only a partial amount of the solid compound paste is heated and softened per time period that is adapted to the conveying capacity of the pump (and/or the feed of the barrel follower plate pump). In some exemplary embodiments, a further effect is that an excessive demixing may be avoided when respectively only partial amounts of the solid compound paste are softened. The barrel follower pump may generally be also referred to as follower plate pump or barrel follower plate pump. The pump is arranged to be combined with a barrel follower plate, wherein the barrel follower plate displaces a defined amount of the (softened) solid compound paste, and wherein the displaced solid compound paste is at least partially conveyed by the pump along the conveyor device to the dosing device.

According to a further exemplary embodiment of the device, the pump is arranged as barrel follower pump and arranged to be coupled with a container that comprises a vessel that is filled with a solidified amount of the solid compound paste, wherein the heating device comprises a heating unit that is arranged to be coupled to the vessel and that, in some exemplary embodiments, surrounds the vessel at least sectionally in a sheath-style manner. In this way, the solid compound paste may be softened to be conveyed by the pump. The heating unit may comprise segments that are arranged to be selectively activated and deactivated. The segments may be for instance angularly shaped. Also in this way, the container may be sectionally softened. The heating unit may be activated in synchronism with the actual filling level of the vessel.

According to a further exemplary embodiment of the device, the conveyor device comprises a pump unit that is arranged as a displacement unit, wherein the at least one pump is arranged as a plunger displacement element and cooperating with a vessel, wherein the pump that is arranged as plunger displacement element acts on a non-softened rear portion of the solid compound paste to bring out a frontal portion of the solid compound paste in a defined manner through an outlet opening, wherein the heating device comprises a heating unit that, in some exemplary embodiments, effects a sectional softening of the solid compound paste in the region of the outlet opening. In other words, the conveyor device in accordance with this aspect may be arranged similar to a pastry press and/or a grease-gun, or similar to a dispensing unit of a glue gun, wherein, in some exemplary embodiments, in the vicinity of an outlet a softening of the solid compound paste is effected. The pump unit that is arranged as displacement unit may be arranged in the vicinity of the dosing device. In this way, long lines between the pump unit and the dosing device and/or the machining tool may be avoided. A pump-shaped pressing-out unit of this kind is suitable for providing moderate amounts (for instance between 1 to 10 kg of the solid compound paste). It is not necessarily required to centrally provide a great amount of the solid compound paste.

The above embodiment is for instance suitable for grinding agents and/or polishing agents that are not suitable for the conventional processing as solid compound paste bars. This may relate to polishing agents for high gloss applications. Grinding agents and/or polishing agents of this kind are regularly extremely fragile and brittle. This would involve a great number of breaks or breakouts when the melting and/or softening due to the relative movement between the disc and the solid compound paste bar takes place that would result in a greatly impaired machining quality. Further, the above arrangement is suitable for applications having a small and/or moderate consumption of grinding agents or polishing agents.

In regard of the use, the above mentioned and other objects are achieved by a use of a solid compound paste for surface treatment that involves abrasives, for instance a paste having a lipid based carrier material to which abrasives are admixed, for manufacturing a container that comprises a vessel that is filled with a solidified amount of the solid compound paste, wherein the vessel is, in some exemplary embodiments, filled with a compact amount of the solid compound paste, wherein the container is arranged to be used for dispensing solid compound pastes for surface treatment to a machining tool, and wherein the solid compound paste is directly processed in the vessel, for instance softened in the vessel and conveyed by a pump unit out of the vessel. The solid compound paste may involve a polishing paste, brushing paste and/or grinding paste.

According to a refinement, the use relates to a solid compound paste wherein at least some components are modified or thixotropic to prevent or, at least, defer demixing when at least parts of the solid compound paste are in a softened state.

It goes without saying that the methods, devices, systems and uses described herein may be further developed in the same or a similar fashion without explicitly mentioning this. Further, it is to be understood that the previously mentioned features and the features mentioned in the following may not only be used in a certain combination, but also in other combinations or as isolated features without leaving the spirit and scope of the present disclosure.

BRIEF DESCRIPTION OF THE DRAWINGS

Further features and advantages of the disclosure are disclosed by the following description of a plurality of exemplary embodiments, with reference to the drawings, wherein.

DETAILED DESCRIPTION OF EXEMPLARY EMBODIMENTS

Figure 1:
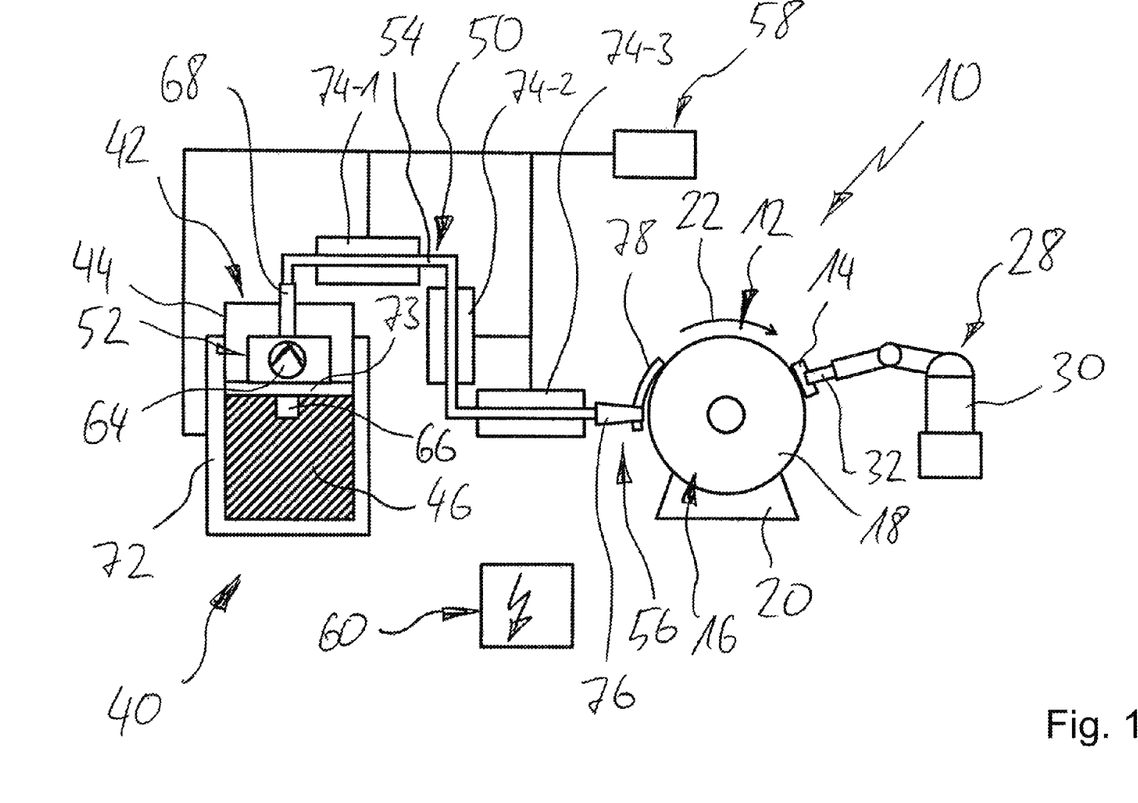
FIG. 1 is a greatly simplified schematic view of a system for surface treatment of workpieces.

FIG. 1 shows in a greatly simplified schematic view a system 10 for surface treatment of workpieces 14, particularly for grinding processing and/or polishing processing. The system 10 may be arranged in accordance with some aspects as described herein and/or arranged for performing methods in accordance with at least some aspects as described herein.

The system 10 comprises at least one processing device 12 that is arranged to cooperate with the workpiece 14 to process the same. The processing device 12 particularly comprises at least one machining tool 16 that is arranged as wheel or disc 18, for instance. The machining tool 16 may particularly be arranged as a polishing disc, brush or grinding disc. The machining tool 16 may be provided with a frame and a drive (in FIG. 1 merely shown in block style and designated by 20), as generally known. Accordingly, the machining tool 16 may be set into a movement, particularly a rotation movement, refer to an arrow designated by 22 in FIG. 1.

Generally, the workpiece 14 could be manually brought into contact with the machining tool 16 to machine, particularly to polish the workpiece 14. In particular in the context of industrial applications, however, it is preferred to provide at least one handling device 28 that may for instance involve a robot 30. The handling device 28 may comprise at least one gripper 32 that is arranged to grip and to hold the workpiece 14. The handling device 28 may be arranged to grip workpieces 14 to be machined (unmachined parts) and to lead the same to the machining tool 16 as desired. In particular, the handling device 28 may be further arranged to induce defined relative movements of the workpiece 14 with respect to the machining tool 16 during the contact or engagement between the workpiece 14 and the machining tool 16 to smoothen and/or to grind or polish the workpiece 14 as desired.

The surface treatment is performed under the addition of polishing agents that are added to the machining tool 16. Hence, it is necessary to apply the grinding agent, brushing agent or polishing agent defined in the desired quantities to the machining tool 16.

To this end, the system 10 comprises a device 40 that is arranged for dispensing solid compound pastes for surface treatment in accordance with several aspects of this disclosure. The device 40 may be arranged to cooperate with a container 42 that is for instance arranged in a barrel-like or canister-like fashion. The container 42 may comprise a vessel 44 in which a compact amount of a solid compound paste 46 is accommodated. As already described herein before, the solid compound paste 46 comprises, at room temperature, a basically rigid consistency that may for instance correspond to the consistency of deep-frozen butter. Accordingly, the solid compound paste may in any case not be easily conveyed and processed at room temperature. The solid compound paste 46 may contain a carrier material that is basically formed from lipids, particularly from fats, oils, waxes, and from mixtures thereof. Abrasively effective abrasives may be admixed to the carrier material. The vessel 44 may be arranged as a reusable barrel. In particular, the vessel 44 may be arranged as pressure container.

The vessel 44 may be arranged as metal vessel. Further, vessels 44 made from plastics and further even from cardboard are conceivable. A support or stiffening of such a vessel 44 may be provided by appropriate stiffening rings, for instance. The vessel 44 ist for instance arranged in a barrel-like or canister-like fashion. Further, also a tubular arrangement and/or an arrangement as foil bag is conceivable when respective dispensing devices are provided, for instance cartridge guns, and such like.

The system 10 further comprises a conveyor device 50 that is basically arranged to feed the solid compound paste 46, provided that it is transferred to a sufficiently conveyable state, to the machining tool 16. The conveyor device 50 may particularly involve a pump unit 52. Further, the conveyor device 50 may comprise a conveying path 54 that comprises at least one line that is arranged between the container 42 and the machining tool 16. The line may be at least sectionally formed from pipes and/or at least sectionally formed from tubes. Further, the system 10 comprises a dosing device 56 that is arranged to dispense a softened paste that may be obtained from the solid compound paste 46 in the container 42 defined in a desired amount.

Besides, the system 10 may comprise a heating device 58 that is arranged to heat at least partial amounts of the solid compound paste 46 in a defined manner to transfer the same to a softened state, particularly to a pasty state or past-like state. The heating device 58 generally may be coupled to the container 42, the conveyor device 50, the pump unit 52 and/or the dosing device 56 to ensure that the softened paste assumes a desired consistency along its entire path between the container 42 and the machining tool 16. Basically, it may also be envisaged that the heating device 58 primarily acts on the solid compound paste 46 that is provided in the container 42 to soften the same at least sectionally. Assuming that it is ensured that the softened paste, thereafter, is not cooled down until it solidifies or at least becomes less flowable (fluid) so that functional defects or even damages for the dispensing device 40 are potentially imminent, the heating device 58 may merely act on partial segments of the dispensing device 40. The dispensing device 40 may further comprise a control device 60 that may control and regulate several functions of the involved components.

The pump unit 52 may comprise at least one pump 64 that may comprise an inlet 66 and an outlet 68. By way of example, the pump 64 may be arranged as a barrel follower pump and directly cooperate with the container 42 to feed fractions of the solid compound paste 46 out of the container. The outlet 68 of the pump may be coupled with the at least one conveyor path 54.

The heating device 58 may comprise at least one heating unit 72, 73, 74. In some exemplary embodiments, the heating unit 72 is used to heat at least a partial amount of the solid compound paste 46 in the vessel 44. In particular, the heating unit 72 may be coupled with the pump 64 and/or may be arranged adjacent to the pump 64 to ensure that the solid compound paste 46 is sufficiently softened in the region of the inlet 66.

The heating unit 72 may be arranged in a sheath-like manner, for instance, to surround the vessel 44 at least sectionally. When the vessel 44 is arranged in a barrel-like or cylindrical fashion, the heating unit 72, respectively, may be arranged in a cylindrical fashion and involve, for instance, heating pads that at least sectionally encompass the vessel 44.

A further heating unit that may be used in the alternative or in addition to the heating unit 72 is indicated in FIG. 1 by 73. The heating unit 73 is coupled to the pump 64. When the pump 64 is arranged as a barrel follower pump or barrel follower plate pump, as already basically described herein before, the heating unit 72 may be coupled to the barrel follower plate to retract together with the same deeper in the vessel 44 as the fill level decreases. Hence, in some exemplary embodiments, the portion of the solid compound paste 46 that is directly adjacent to the barrel follower plate pump, respectively, is heated and/or softened to be removed and conveyed by the pump 64. This may involve significant energy savings. In some exemplary embodiments, only a limited volume of the solid compound paste 46 is softened per time unit. In this way, a demixing of components of the solid compound paste 46 may be counteracted.

The heating unit 74 may involve elements 74-1, 74-2, 74-3. In particular, the heating unit 74 may be arranged to temper the softened paste as it goes along the conveying path 54, as desired. It is ensured in this way that the softened paste has a sufficient "fluidic" behavior when it exits the dosing device 56. It goes without saying that also the dosing device 56 may be tempered and, accordingly, provided with or coupled to a heating unit.

The heating units 72, 73, 74 indicated in FIG. 1 may be used in combination or in the alternative. Depending on the resulting length of the conveying path 54, a respective heating unit 74 may be formed there. When the conveying path 54 is sufficiently short and/or the softened solid compound paste 46 is conveyed from the vessel 44 to the dosing device 56 in such a short time that a re-solidifying may be avoided, the heating device 74 for the conveying path 54 may be dispensed with, at least in some embodiments. In the alternative, the heating unit 74 for the conveying path 54 may be selectively activated to prevent a solidification of the softened solid compound paste 46. This may also be applicable in the context of maintenance work, conversion work and repair work.

The dosing device 56 may particularly involve a nozzle 76. The nozzle 76 may involve a dispense opening for the softened paste. In some exemplary embodiments, the nozzle 76 is arranged as wide slot nozzle. In some exemplary embodiments, the nozzle 76 may be coupled to a guide plate 78 that ensures a simplified entrainment or reception of the softened paste discharged through the nozzle 76 by the machining tool 16.

Figure 2:
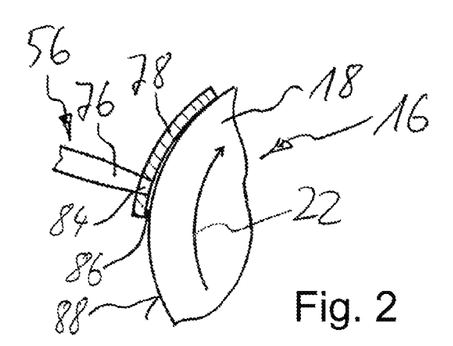
FIG. 2 is an enlarged schematic partial view of an embodiment of a nozzle and/or a guide plate that may be implemented in the system according to FIG. 1.
Figure 3:
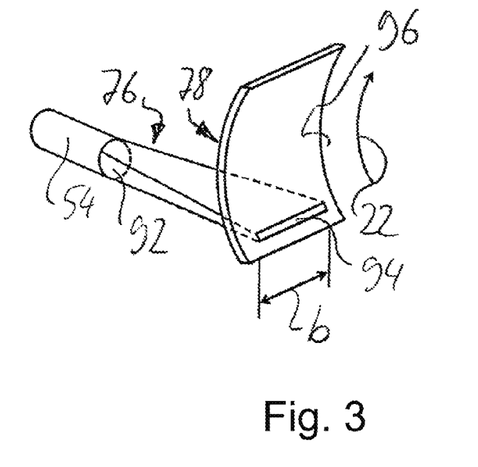
FIG. 3 is a simplified schematic perspective view of the embodiment according to FIG. 2.
Figure 4:
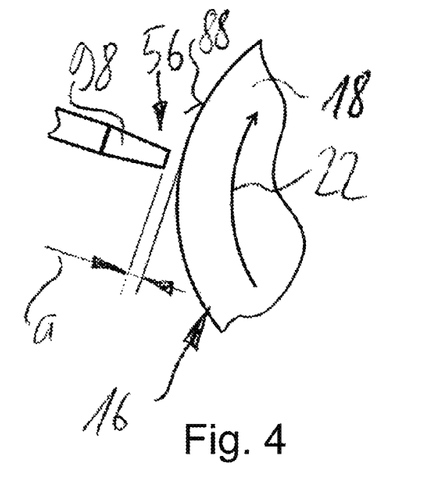
FIG. 4 is a simplified schematic view of a further embodiment of a nozzle that may be implemented in the system according to FIG. 1.

Several conceivable arrangements of the dosing device 56 will be elucidated and further detailed with respect to the greatly simplified schematic views according to FIGS. 2, 3 and 4. A first embodiment of a nozzle 76 and a guide plate 78 is shown by FIGS. 2 and 3. It can be seen in FIG. 2 that the guide plate 78 is adapted to the machining tool 16 in a specific way, particularly to a circumference 88 of the machining tool 16. In some exemplary embodiments, the guide plate 78 contacts the circumference 88 at least approximately tangential. The guide plate 78 may be arranged as a tubular segment or mud guard-like, for instance. The guide plate 78, in the alternative, may also be arranged as an approximately plate-shaped part. It is not necessary to have the guide element 78 permanently in contact with the circumference 88 of the (rotating) machining tool 16. However, the guide plate 78 may be at least sectionally brought into contact with the machining tool 16 to dispense the paste thereto and/or to massage the paste therein.

The guide plate 78 may also be referred to as guide plate or pressure guide plate. The guide plate 78 and the circumference 88 of the machining tool 16 may jointly define a slot 86 that is tapered in a direction towards an end that is offset from the outlet opening 84 of the nozzle 76 in the guide plate 78 in the direction of rotation. Hence, the softened paste may be dispensed through the outlet opening 84 in a specific manner and may be urged into the slot 86, due to the movement of the machining tool 16 (arrow 22), to be eventually at least partially entrained by the machining tool 16. In this way, it may be ensured that a huge fraction of the dispensed softened paste is actual transferred to the machining tool 16. Losses, particularly centrifugal losses and pollution occurring in conjunction therewith, may be minimized. It is generally preferred that the guide plate 78—at least during the defined contact with the machining tool 16—at least sectionally abuts the machining tool 16 in an areal fashion, particularly under pressure. In particular, the guide plate 78 may be arranged as a wear part or wear plate. When the guide plate 78 and the machining tool 16 at least temporarily contact one another, wear at the guide plate 78 has to be expected, depending on the type of the used material. This can be counteracted in a simple manner by arranging the guide plate 78 replaceable and deliberately as a wear part. In the alternative, the guide plate 78 may deliberately be arranged to be wear resistant. This may for instance involve a manufacture from ceramic materials. By way of example, also a wear protection layer from cubic boron nitride (CBN) is conceivable. Other wear resistant materials and wear resistant coatings are conceivable. Hence, the service life of the guide plate 78 may be significantly extended.

FIG. 3 shows a perspective arrangement of a corresponding embodiment of the nozzle 76 and the guide plate 78. The nozzle 76 may particularly be arranged as a wide slot nozzle. The wide slot nozzle 76 is arranged to convert a basically round cross section 92 to a thin (and/or low) but wide cross section 94 at the outlet opening 84. The round cross section 92 may correspond to a conveyor cross section at the conveying path 54. The cross section 94 is, in some exemplary embodiments, adapted to a width b of the machining tool 16 to ensure that the same is reliably supplied with the softened paste, for instance along its entire width b. The guide plate 78 may comprise an entrainment surface 96 at the side thereof that is facing the machining tool 16 from which the softened paste may be picked up by the das machining tool 16.

FIG. 4 elucidates an alternative embodiment of a dosing device 56. The dosing device 56 according to FIG. 4 comprises a high pressure nozzle 98 through which the softened paste may be applied at such a high pressure that a distance a between the high pressure nozzle 98 and the circumference 88 of the machining tool 16 may be bridged without further ado. Also in this way, the softened paste may be reliably transferred to the machining tool 60. Also the high pressure nozzle 98 may be coupled to a respective guide plate 78 that may generally be arranged similar to the embodiments illustrated with reference to FIGS. 2 and 3. Further, also the high pressure nozzle 98 may be arranged to wet and/or to supply the machining tool 16 along its entire width b.

Figure 5:
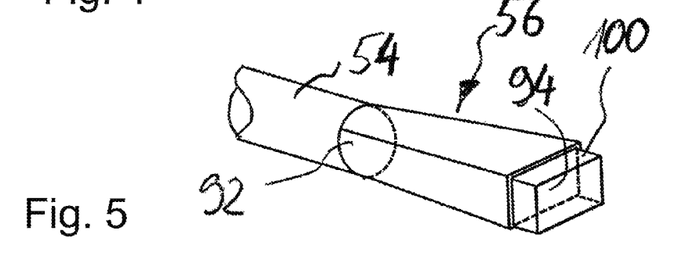
FIG. 5 is a simplified schematic view of a dosing device having a dispensing element for dispensing a rod of a solid compound paste that is again solidified.

FIG. 5 elucidates a further alternative arrangement of a dosing device 56. In contrast to the embodiments according to FIGS. 2 to 4, the dosing device 56 shown in FIG. 5 does not comprise a nozzle for dispensing the softened solid compound paste. As generally known, the dosing device 56 may comprise a tube arrangement or line arrangement that departs from a first cross section 92 and ends in a second cross section 94, for instance. At the second cross section 94, a dispensing opening is provided. The line arrangement may form part of the conveying path 54. First cross section 92 is for instance circular or at least approximately circular. The second cross section 94 may be arranged similar to a die, particularly similar to an extrusion die. In other words, the second cross section 94 may namely define the cross sectional extension of a re-solidified solid compound paste that is formed by at least partially solidifying and dispensing the paste in the dosing device 56. Accordingly, the dosing device 56 in accordance with FIG. 5 may comprise a cooling path.

The solidification may be induced actively (for instance by active cooling) or passively (for instance by adaption to an environmental temperature). Ideally, the solid compound paste remains in the dosing device 56 (just) flowable and solidifies in a narrow temporal connection with the exit from the second cross section 94. In this way, at the outlet of the dosing device, a solid compound paste bar or a solid compound paste rod may be provided at which the machining tool 16 (not separately shown in FIG. 5) may soften and remove partial amounts due to respective friction. Accordingly, the solid compound paste may be softened to simplify handling and transport and to enable a continuous supply without huge delay times. Nevertheless, the softened paste may, again, be transferred from the pasty to the solid state by a defined solidification so that the transfer to the machining tool 16 may be accomplished as generally known.

Figure 6:
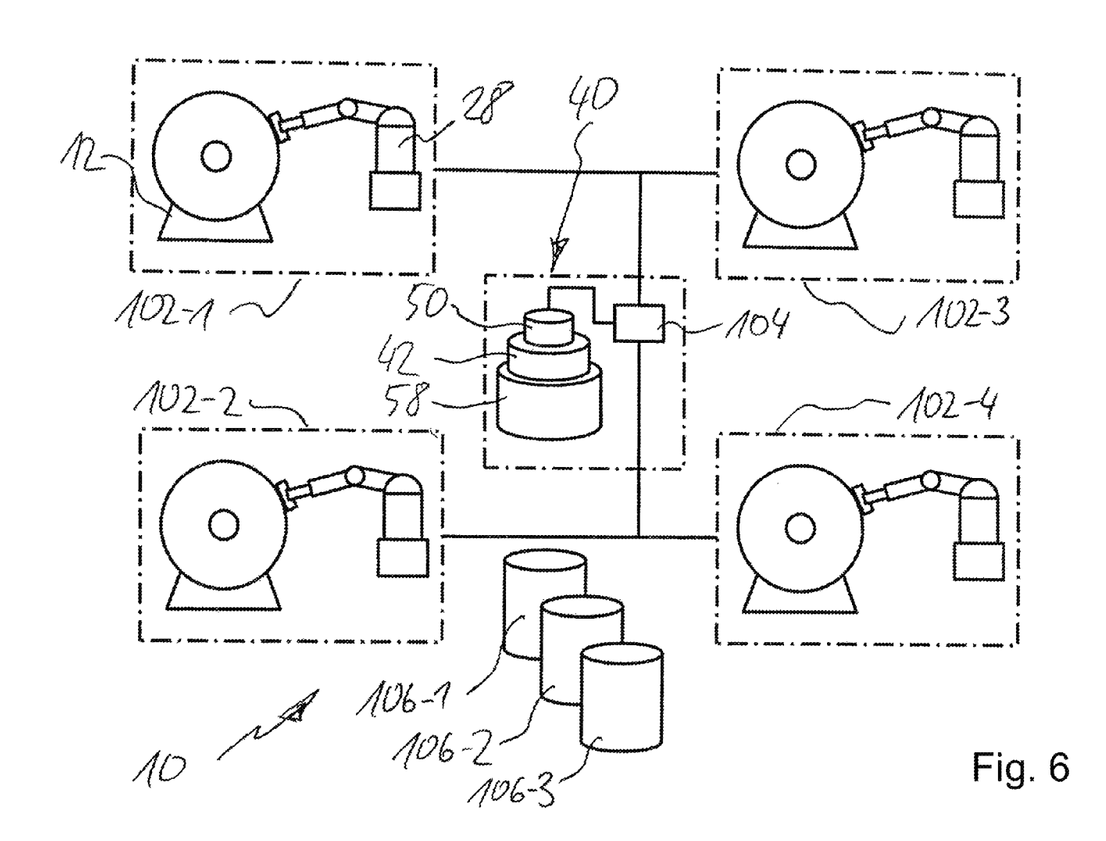
FIG. 6 is a simplified schematic view of functional blocks of a further embodiment of a system for surface treatment of workpieces.

FIG. 6 elucidates an alternative embodiment of a system 10 for surface treatment of workpieces. In contrast to the embodiment according to FIG. 1, the system according to FIG. 6 comprises a plurality of processing cells 102-1, 102-2, 102-3, 102-4, for instance, in each of which a processing device 12 and a corresponding handling device 28 may be arranged. The system 10 further comprises a central dispensing device 40 for the solid compound paste 46 that is provided in the container 42.

Basically, the dispensing device 40 may be arranged at least similar to the arrangement according to FIG. 1, and may comprise similar components. In particular, as basically already described herein before, a conveyor device 50 and a heating device 58 may be provided. The supply of the respective cells 102-1, 102-2, 102-3, 102-4 may be effected by means of a distributor 104 that is provided with valves and such like, for instance, to enable or disable respective paths to the cells 102-1, 102-2, 102-3, 102-4.

In FIG. 6 there are further shown exemplary replacement containers 106-1, 106-2, 106-3 that are basically shaped similar to the container 42. The replacement container 106-1, 106-2, 106-3 may be arranged as barrels that are compatible with barrel follower pumps. When it is determined that the container 42 is fully emptied or nearly fully emptied, a respective replacement by a replacement container 106 may be performed. The system 10 according to FIG. 6 could be extended so that the dispensing device 40 is arranged to simultaneously cooperate with two containers 42. In this way, it could be ensured that at any time one container 42 is provided in which a sufficient amount of the solid compound paste 46 is provided. In this way, idle times for the replacement of the container may be avoided.

Figure 7:
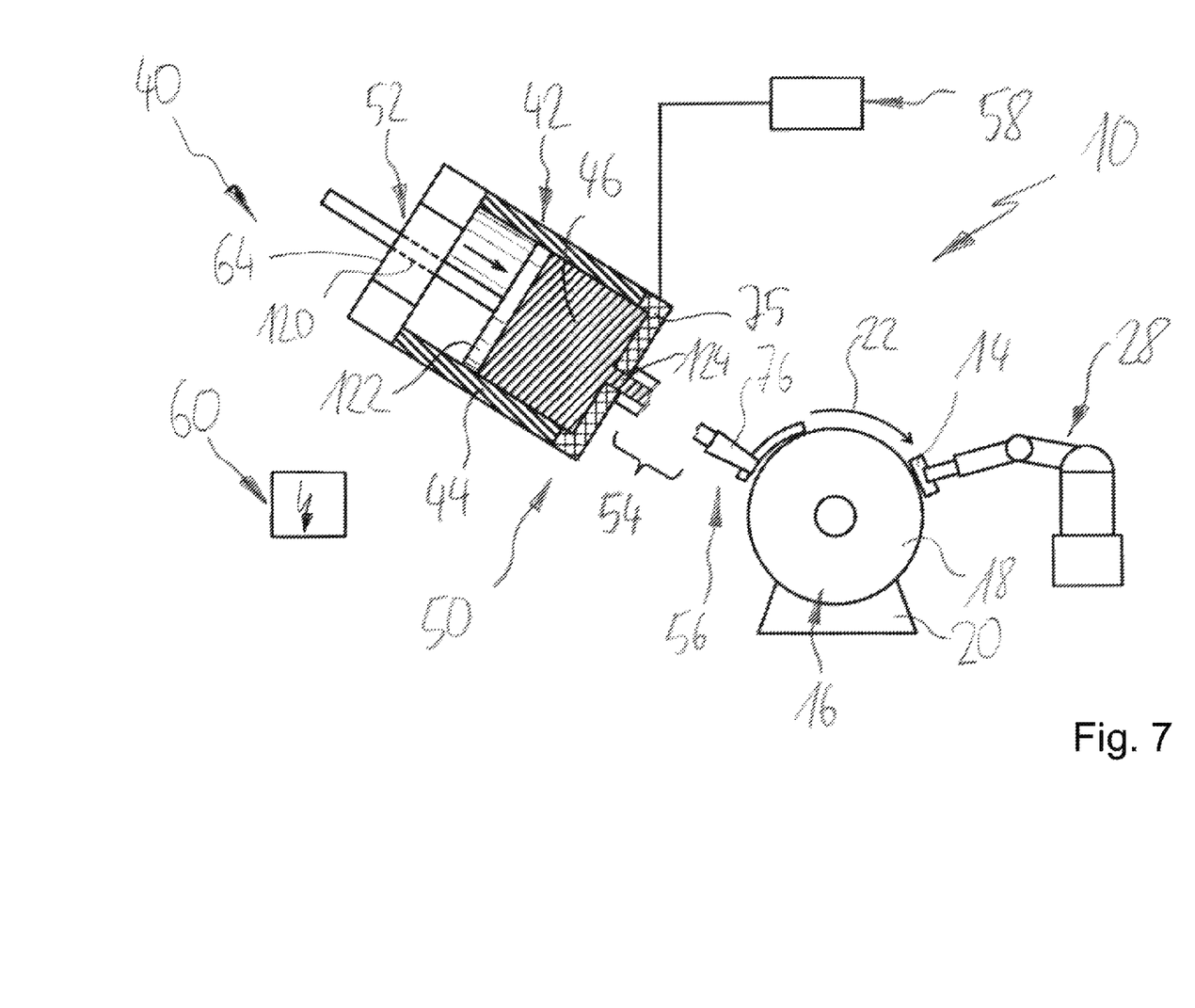
FIG. 7 is a greatly simplified schematic view of an alternative embodiment of a conveyor device for a system for surface treatment.

FIG. 7 shows an alternative embodiment of a conveyor device 50 for a system 10 for surface treatment that comprises a dispensing device 40. In particular in regard of the arrangement of a processing device 12 of the system 10, supplemental reference is made to FIGS. 1 to 6. The dispensing device 40 and at least the processing device 12 are shown in FIG. 6 for illustrative purposes not in true scale with respect to one another.

The conveyor device 50 comprises a pump unit 52 that is arranged as a displacement unit that may also be referred to as press or dispensing press. The at least one pump 64 is arranged as a plunger displacement element (or plunger press). The container 42 is arranged in accordance with the type of a filled cartridge, for instance similar to a silicon cartridge. The vessel 44 is arranged for accommodating an amount of the solid compound paste 46 that assumes in the vessel 44 for instance a sausage shape or bar shape. The pump 64 comprises a drive 120 and a plunger 122. The drive 120 acts on the plunger 122. The plunger 122 is associated to a rear portion of the solid compound paste 46 to urge the solid compound paste 46 towards an outlet opening 124, refer to a respective arrow in FIG. 7.

In the region in which the plunger 122 is arranged, the solid compound paste 46, in some exemplary embodiments, remains in the solid, non-softened state. Hence, the plunger 122 may directly move a frontal segment of the solid compound paste 46 towards the outlet opening 124. The identifier rear portion and frontal portion designate ends of the solid compound paste 46 accommodated in the vessel 44 that are facing away from one another. The frontal portion is assigned to the outlet opening 124. The rear portion is assigned to the plunger 122. Adjacent to the outlet opening 124, a heating unit 75 of a heating device 58 is arranged to soften a partial amount of the solid compound paste 46. Hence, the "solid" fraction of the solid compound paste 46 urges the "softened" fraction of the solid compound paste 46 out of the vessel 44. Lines of a conveying path 54 for the softened solid compound paste 46 may adjoin the outlet opening 124 that end in the dosing device 56. In FIG. 7, the conveying path 54 is shown in a greatly simplified and broken view. However, it may also be envisaged to couple the outlet opening 124 directly with the dosing device 56.

The arrangement of the device 40 according to FIG. 7 is particularly suited for surface treatments that do not involve a huge consumption of the solid compound paste 46. Hence, the vessel 44 may be kept relatively small so that the device 40 overall may be formed to be compact. It goes without saying that the device 40 according to FIG. 7 may nevertheless also be arranged with huge stored amounts of the solid compound paste 46 and respective vessels 44.

Figure 8:
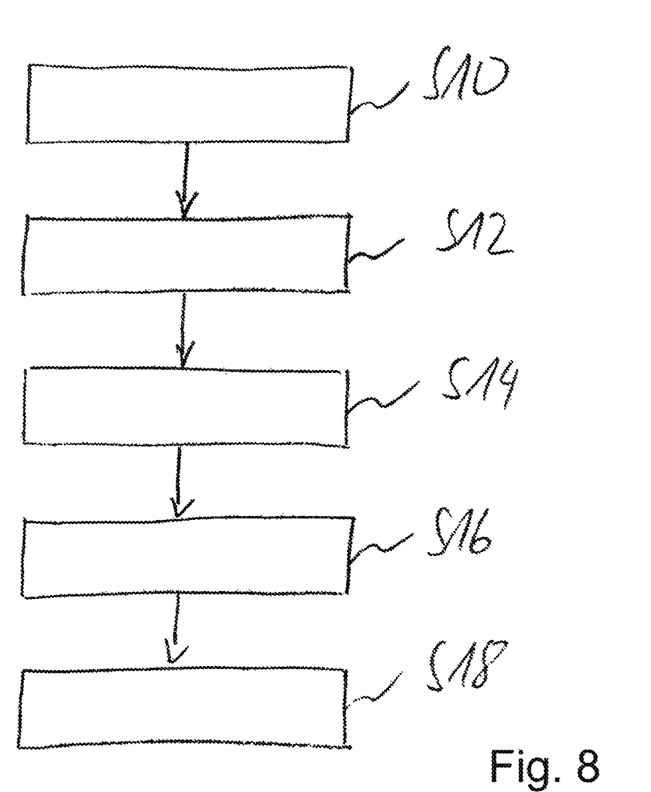
FIG. 8 is a schematic block representation of an embodiment of a method for dispensing solid compound pastes for surface treatment to a machining tool.

FIG. 8 elucidates in a simplified fashion with reference to a schematic block diagram an embodiment of a method for dispensing solid compound pastes for surface treatment to a machining tool. The method may involve a step S10 that comprises the provision of a solid compound paste for surface treatment, particularly the provision of a container including the solid compound paste. In a subsequent step S12, at least a partial amount of the solid compound paste may be softened by heating. It is however desired in the step S12 that a mixing level of the paste with abrasives is maintained. In some exemplary embodiments, the solid compound paste is already softened in the container. A step S14 may follow that may involve conveying, particularly pumping, the softened paste from the container. To this end, the container may be coupled to the pump unit, in some exemplary embodiments, to a barrel follower pump. In a subsequent step S16, the softened paste may be conveyed via a conveying path to a dosing device. This may involve, in at least some embodiments, a further supply with thermal energy to prevent that the softened paste solidifies. In a further step S18, the softened paste may be dispensed through a nozzle, for instance, and eventually apply to a tool for surface treatment. This may be achieved, for instance, by entraining or picking up the softened paste by the tool from a guide plate.

Figure 9:
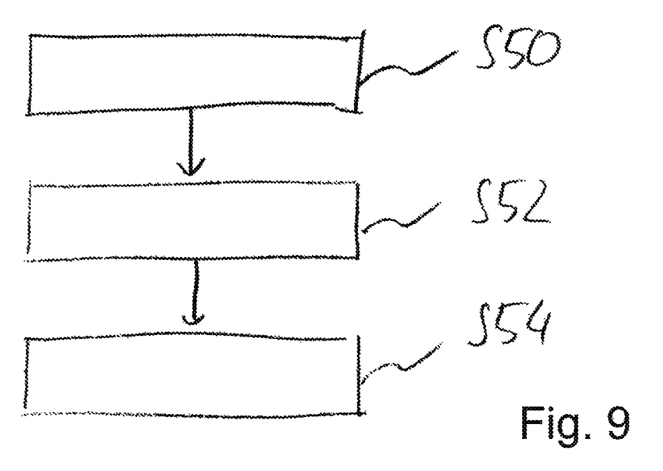
FIG. 9 is a schematic block diagram of an embodiment of a method for surface treatment of workpieces.

FIG. 9 illustrates in a simplified fashion with reference to a schematic block diagram an embodiment of a method for surface treatment of workpieces, particularly for grinding, brushing or polishing. The method may involve a step S50 that substantially involves the provision of a machining tool, particularly the provision of a polishing disc or brush that is arranged to receive a solid compound paste for surface treatment in a softened state and to engage a workpiece therewith to smoothen the same.

A step S52 may follow that involves dispensing a solid compound paste for surface treatment to the machining tool. The dispensing may involve an application of a softened paste. In particular, the dispensing may be performed in accordance with the embodiment elucidated with reference to FIG. 8 and/or in accordance with at least some aspects of the dispensing method described in a context of this disclosure. Eventually, a step S54 may follow that involves the machining as such, i.e. for instance the grinding or polishing, generally a smoothening, of the workpiece. In some exemplary embodiments, the steps S52 and S54 are highly automated.

What is claimed is:

1. A method for dispensing solid compound pastes for surface treatment to a machining tool comprising the following steps:
   providing a solid compound paste for surface treatment that contains abrasives,
   softening at least a partial amount of the solid compound paste by supplying thermal energy,
   feeding the softened solid compound paste to a dosing device by means of an abrasive media conveyor device, and
   applying the softened solid compound paste to a machining tool by means of the dosing device.

2. The method as claimed in claim 1, wherein the step of providing a solid compound paste comprises providing a solid compound paste having a lipid based carrier material to which abrasives are admixed, wherein the step of softening at least a partial amount of the solid compound paste is performed such that a mixing level of the softened solid compound paste with the abrasives is substantially maintained in the softened state, and wherein the step of applying the softened solid compound paste comprises applying the softened solid compound paste to a tool for surface treatment.

3. The method as claimed in claim 1, wherein the solid compound paste comprises, at room temperature, a stiff-to-plastic consistency, and wherein the solid compound paste is transferred by heating into a softened state in which the softened solid compound paste comprises a plastic-to-soft consistency.

4. The method as claimed in claim 2, wherein the step of softening the solid compound paste is performed sedimentation-free for the admixed abrasives, and wherein the solid compound paste maintains, in the softened state, a substantially homogeneous distribution of the admixed abrasives.

5. The method as claimed claim 1, wherein the step of feeding the softened solid compound comprises pumping by means of a pump unit that is adapted for abrasive media.

6. The method as claimed in claim 1, wherein the step of feeding comprises feeding the softened solid compound paste along a conveyor path of the conveyor device that is at least sectionally heatable.

7. The method as claimed in claim 1, wherein the step of providing the solid compound paste comprises providing a container that comprises a vessel that is filled with a solidified amount of the solid compound paste.

8. The method as claimed in claim 7, wherein the solid compound paste is directly processed in the vessel, comprising softening the solid compound paste in the vessel and feeding the softened solid compound paste by a pump unit out of the vessel.

9. The method as claimed in claim 1, wherein the step of applying the softened solid compound paste comprises dispensing the softened solid compound paste through a nozzle that is adapted to a tool width of the machining tool.

10. The method as claimed in claim 1, wherein the step of applying the softened solid compound paste comprises dispensing the softened solid compound paste to a guide plate that is arranged in a peripheral region of the machining tool, and wherein the softened solid compound paste that is provided at the guide plate is entrained by the machining tool when the machining tool is rotated.

11. The method as claimed in claim 1, wherein the step of applying the softened solid compound paste comprises dispensing the softened solid compound paste under pressure through a high pressure nozzle that is spaced way from the machining tool.

12. The method as claimed in claim 1, wherein the step of providing the solid compound paste comprises providing a solid compound paste having a modified or thixotropic formulation.

13. The method as claimed in claim 12, wherein at least some components of the modified or thixotropic formulation from which the solid compound paste is formed prevent or defer a demixing when at least fractions of the solid compound paste are in a softened state.

14. A method for surface processing of workpieces comprising the following steps:
   providing a machining tool,
   dispensing and applying a solid compound paste for surface treatment to the machining tool in accordance with the dispensing method as claimed in claim 1, and
   machining a workpiece by means of the machining tool to which the softened solid compound paste is applied.

15. The method as claimed in claim 14, further comprising:
   automated machining of a plurality of workpieces that are successively brought into contact with the machining tool by means of a handling device, and
   continuously or quasi-continuously dispensing the solid compound paste to the machining tool.

16. A device for dispensing solid compound pastes for surface processing to a machining tool, the device comprising:

a heating device that is arranged to heat a solid compound paste for surface treatment that contains abrasives, wherein at least a partial amount of the solid compound paste is softened as a result of supplying thermal energy, a conveyor device comprising a pump unit comprising a pump and a conveyor path for the softened solid compound paste, wherein the pump is arranged for conveying abrasive media, and a dosing device arranged for applying the softened paste to a machining tool.

17. The device as claimed in claim 16, wherein the pump is arranged as a barrel follower pump and arranged to be coupled to a container that comprises a vessel that is filled with a solidified amount of the solid compound paste, wherein the heating device comprises a heating unit that is coupled to the pump, and wherein the vessel is actively heatable by the heating unit.

18. The device as claimed in claim 16, wherein the pump is arranged as a barrel follower pump and arranged to be coupled to a container that comprises a vessel that is filled with a solidified amount of the solid compound paste, wherein the heating device comprises a heating unit that is arranged to be coupled to the vessel and that at least sectionally surrounds the vessel sheath-like.

19. The device as claimed in claim 16, wherein the pump unit is arranged as a displacement unit, wherein the pump is configured as plunger displacement pump that cooperates with a vessel and that encloses, together with the vessel, the solid compound paste, wherein the plunger displacement pump acts on a rear portion of the solid compound paste, that is not softened, to dispense a frontal portion of the solid compound paste through an outlet opening, and wherein the heating device comprises a heating unit that sectionally softens the solid compound paste in the vicinity of the outlet opening.

20. A system for automated machining of workpieces, comprising:
   a dispensing device as claimed in claim 16,
   a machining tool that is arranged as one of a polishing disc and a polishing brush, and
   an automated handling device that is arranged to bring workpieces successively into contact with the machining tool for machining the workpieces.

* * * * *